Figure 1:
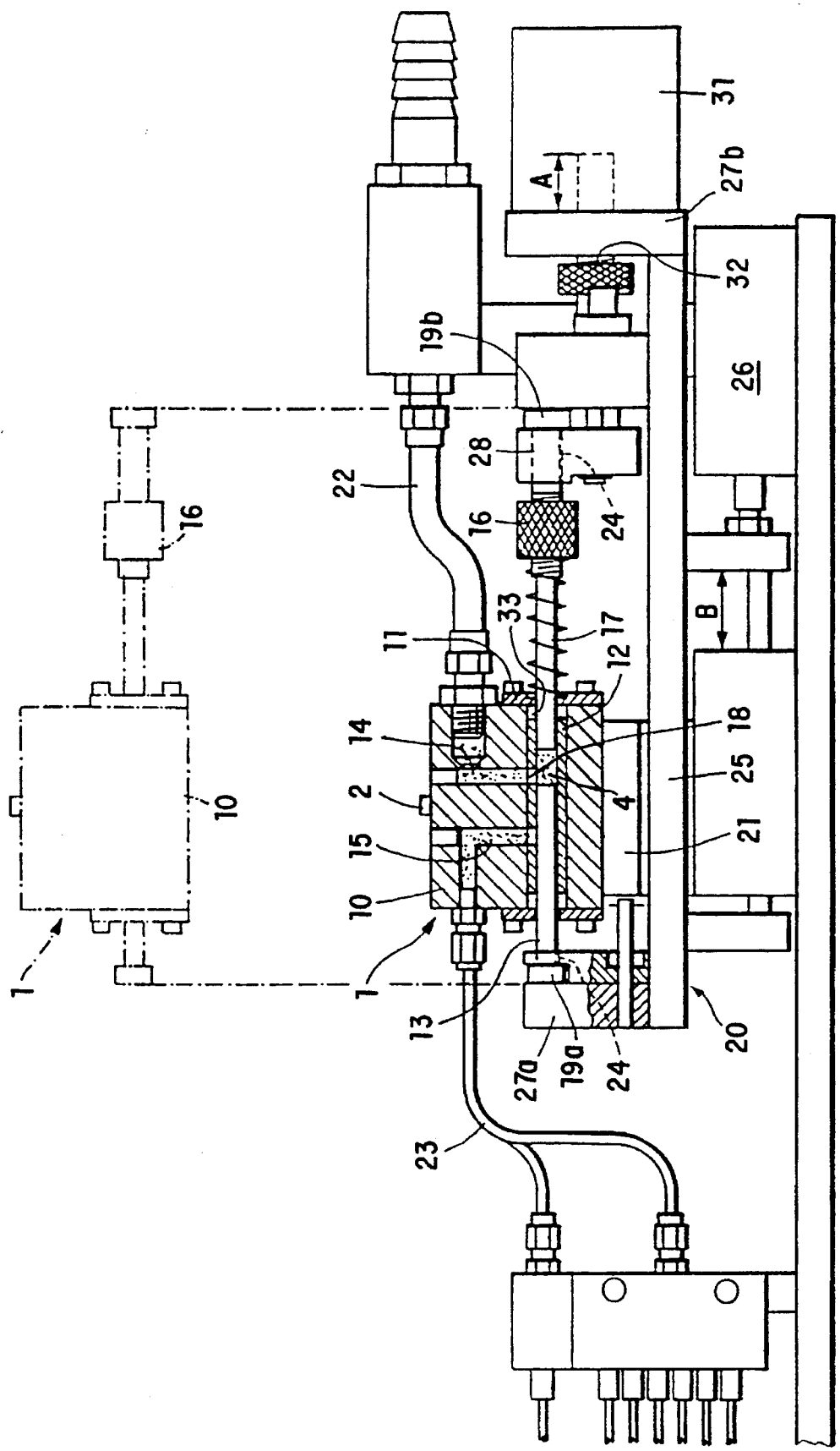

USO05513779A

United States Patent [19]
Reich

[11] Patent Number: 5,513,779
[45] Date of Patent: May 7, 1996

[54] MODULAR METERING DEVICE

[75] Inventor: Leon Reich, Nidau, Switzerland

[73] Assignee: Hormec Technic SA, Nidau, Switzerland

[21] Appl. No.: 351,163

[22] Filed: Nov. 30, 1994

[30] Foreign Application Priority Data

Dec. 3, 1993 [CH] Switzerland .............. 3620/93

[51] Int. Cl.$^6$ .................................................. B67D 5/52
[52] U.S. Cl. ............................................. 222/425; 73/239
[58] Field of Search .................... 73/239; 222/424.5, 222/425, 453

[56] References Cited

U.S. PATENT DOCUMENTS

| 2,659,518 | 11/1953 | Donnelly | 222/453 |
| 3,087,334 | 4/1963 | Brown | 73/863.83 |
| 3,459,332 | 8/1969 | Golden | 222/425 |
| 4,002,070 | 1/1977 | Howell | 73/863.71 |
| 4,347,806 | 9/1982 | Argazzi et al. | 118/710 |
| 4,693,397 | 9/1987 | Lang | 222/137 |
| 4,792,298 | 12/1988 | Tastet | 425/239 |

FOREIGN PATENT DOCUMENTS

| 0133292 | 2/1985 | European Pat. Off. . |
| 2455269 | 11/1980 | France . |
| 2493418 | 5/1982 | France . |
| 2584894 | 1/1987 | France . |
| 2647214 | 11/1990 | France . |
| 664440 | 2/1988 | Switzerland . |

Primary Examiner—Richard Chilcot
Assistant Examiner—Jewel V. Artis
Attorney, Agent, or Firm—Oliff & Berridge

[57] ABSTRACT

The metering device for supplying precisely measured amounts of any viscous or pasty substance comprises a main body (10) in which there is disposed an adjusting socket (12). A stopping pin (13), and a metering piston (17) are disposed opposite one another in the socket, thus bounding a movable metering chamber (4). The main body also contains an admission duct (14) and an ejection duct (15). By means of at least one control unit (31), the metering piston can be displaced, and actuating means (20) permit the stopping pin and the piston to be displaced simultaneously relative to the main body in order to free the access either to the admission duct or to the ejection duct. The main body, the stopping pin, and the metering piston constitute an interchangeable module.

10 Claims, 6 Drawing Sheets

MODULAR METERING DEVICE

This invention relates to metering devices, and more particularly to a single or multiple modular metering device for supplying precisely measured amounts of any viscous or pasty substance, especially a lubricant.

Swiss Patent No. 664,440 describes a volumetric metering apparatus by means of which very precisely measured amounts can be furnished. This metering device is in one piece, which considerably reduces its flexibility of use. Thus, if a measured amount is to be modified, the whole device must be exchanged.

Other prior art devices have metering heads which can be regulated, e.g., by means of an adjustable piston. In this case, only the adjustable metering head allows an adjustment to be made, by varying the path of the piston. The range of adjustment thus permitted is very limited. As soon as a measured amount has to be changed to a greater extent than is possible by varying the stroke of the piston, the metering apparatus must be changed in order to use another one in which the diameter of the piston corresponds to the desired new amount. This means that the user must have a large number of metering devices of different capacities on hand, which causes substantial expense.

It is an object of this invention to provide an improved modular metering device having very great flexibility of use, high precision, and offering very wide possibilities of combinations in cases where several metered quantities must be supplied simultaneously.

To this end, the metering device according to the present invention comprises a main body in which there is disposed an adjusting socket bounding an opening passing through the main body, a stopping pin disposed partially and movably in the socket, a metering piston disposed partially and movably in the socket opposite the stopping pin, a movable metering chamber of variable volume being bounded by the inside wall of the socket, the pin, and the piston, at least one admission duct and one ejection duct, each connected independently to the metering chamber in order to permit the admission and expulsion of the substance to be metered, at least one control unit permitting the metering piston to be displaced in order to fill or to empty the mentioned chamber, actuating means permitting the stopping pin and the piston to be displaced simultaneously relative to the main body in order to free the access either to the admission duct or to the ejection duct, wherein the main body, the stopping pin, and the metering piston constitute an interchangeable module fixed to the actuating means by non-permanent assembling means.

Figure 2:
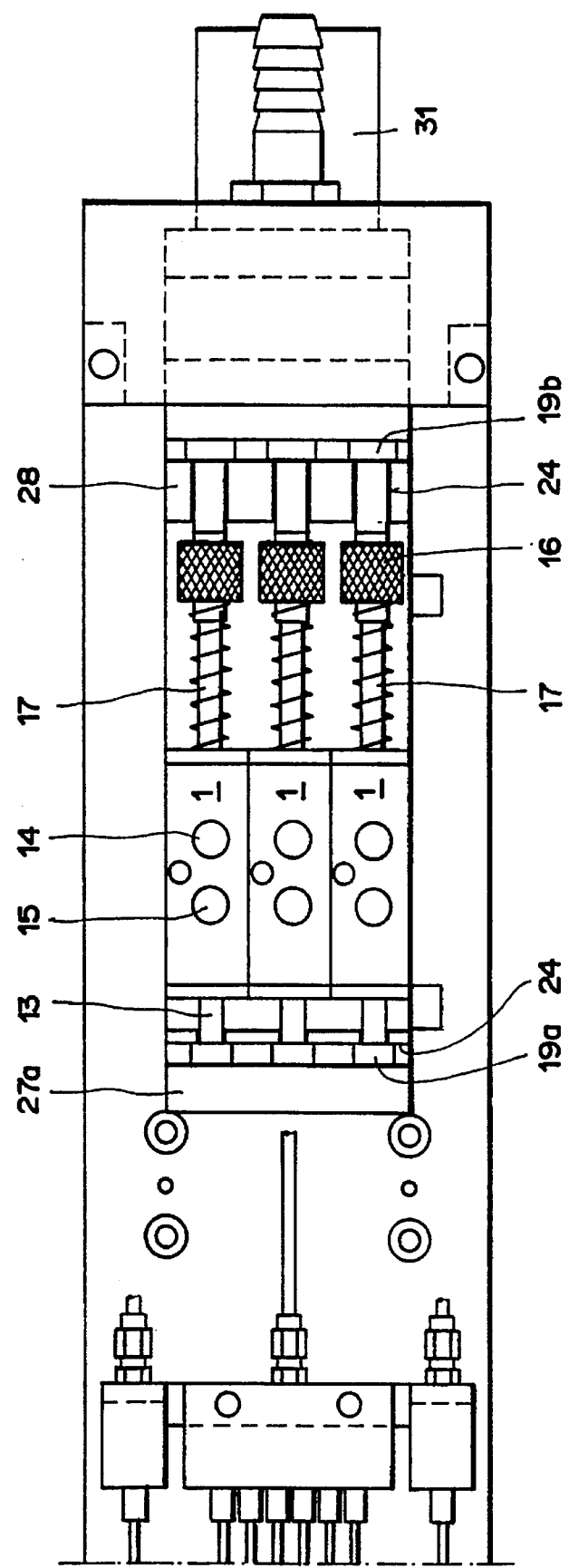
Figure 3A:
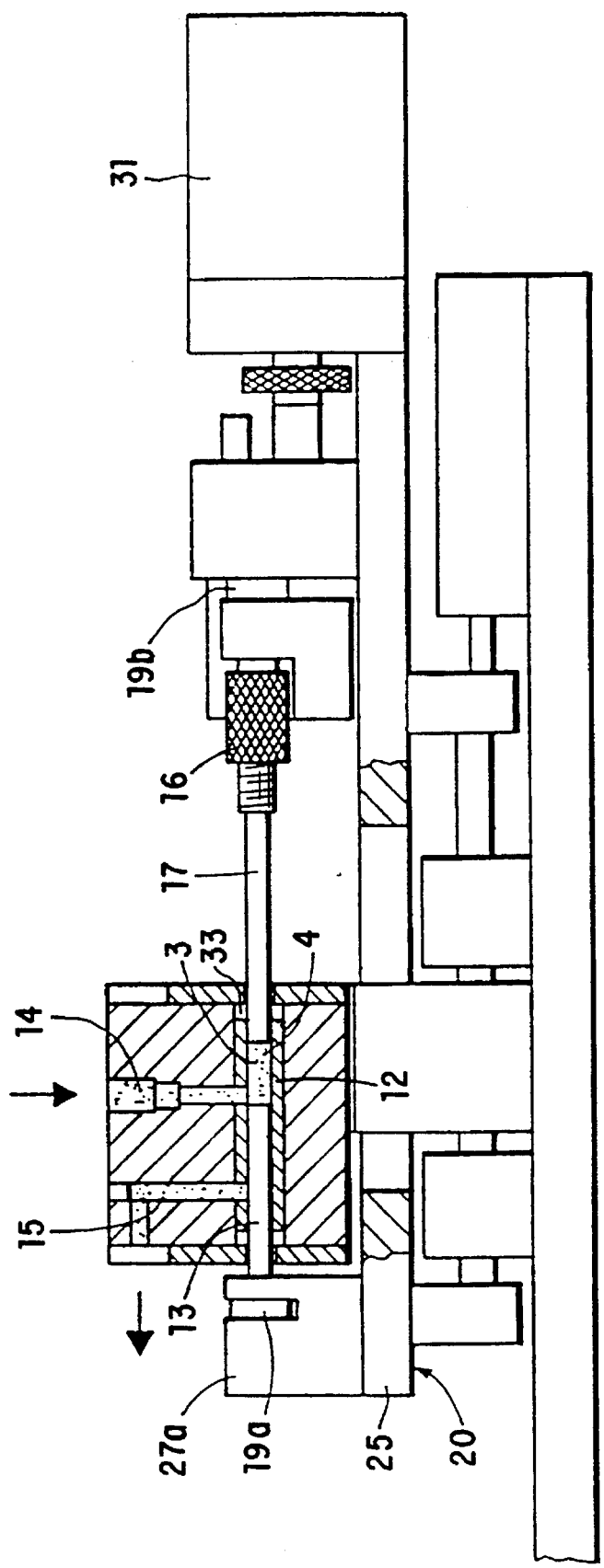
Figure 3B:
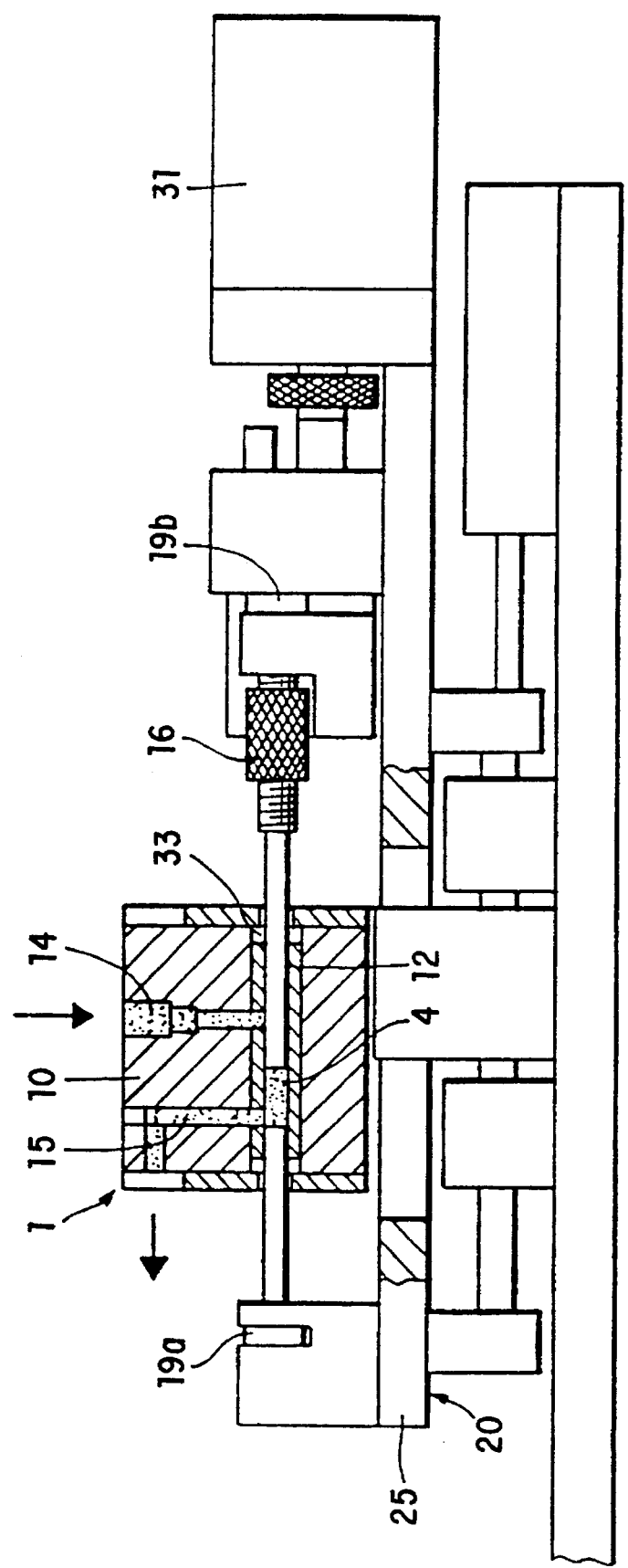
Figure 3C:
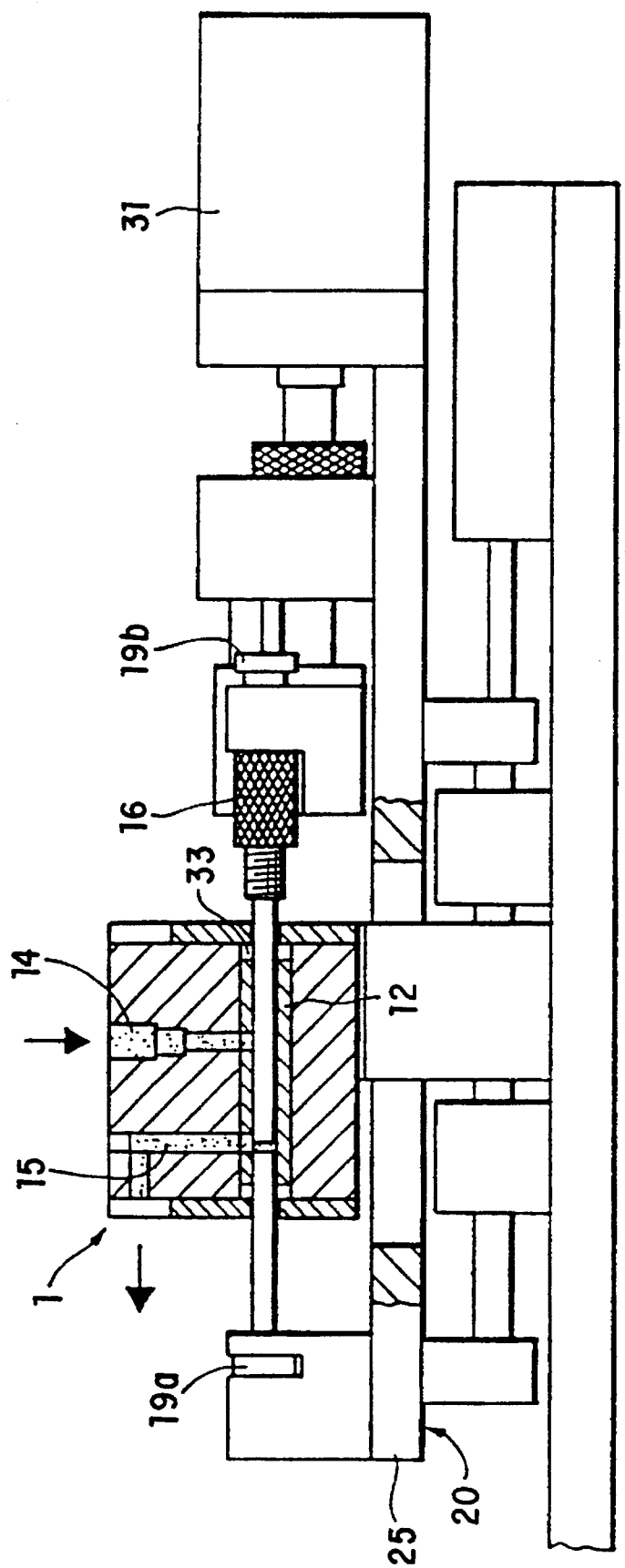
Figure 3D:
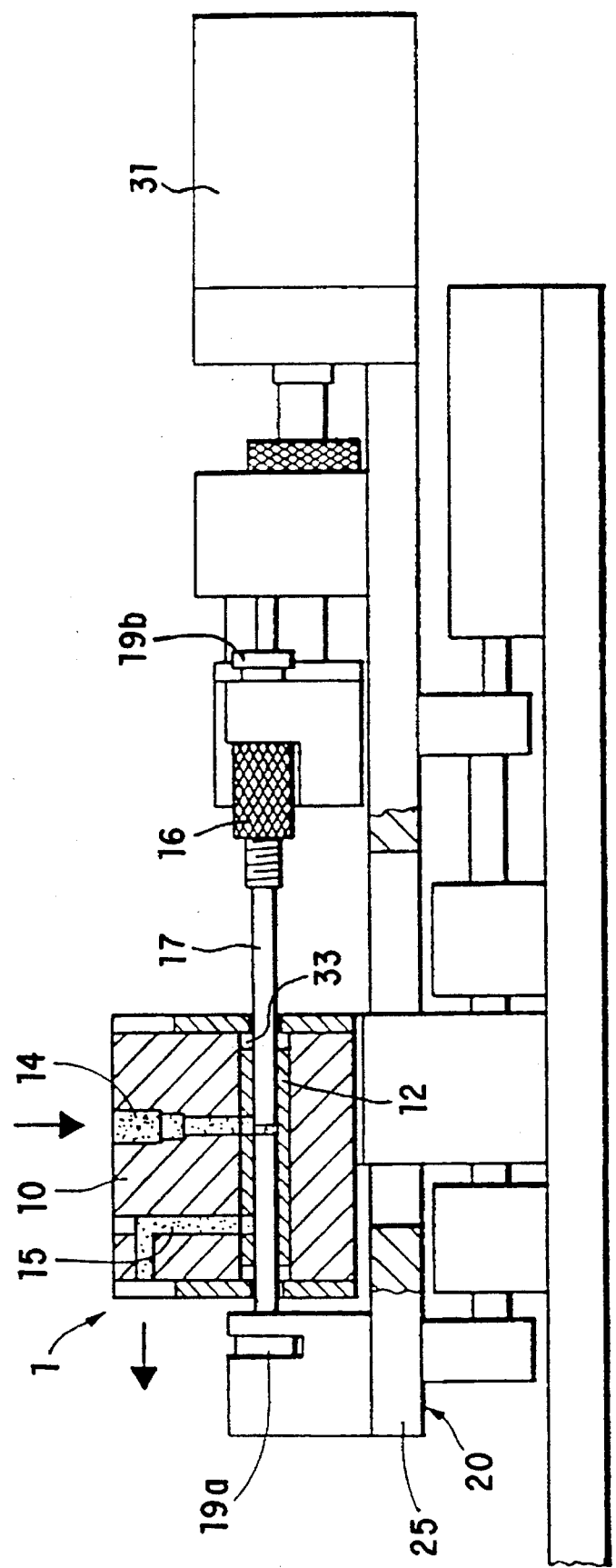

Preferred embodiments of the invention will now be described in detail with reference to the accompanying drawings, in which:

FIG. 1 is a diagrammatic elevation, partially in section, of a single modular metering device in a first embodiment of the invention, the disassembled interchangeable module being shown in a phantom view, FIG. 2 is a diagrammatic top plan view of a multiple modular metering device in a second embodiment of the invention, FIG. 3a is a diagrammatic elevation, partially in section, illustrating a first step in the operation of the inventive device, FIG. 3b is an elevation analogous to FIG. 3a illustrating a second operating step, FIG. 3c is an elevation analogous to FIG. 3a illustrating a third operating step, and FIG. 3d is an elevation analogous to FIG. 3a illustrating a fourth operating step.

An interchangeable metering module 1 comprises a main body 10, preferably of aluminum but which may be made starting from any other suitable metal, composite, plastic material, or the like. A bore 33 is made completely through body 10. An adjusting socket 12, preferable tubular and made of a hard metal alloy or of ceramics, is disposed within the bore and defines a housing containing a stopping pin 13 and a piston 17.

In FIG. 1, adjusting socket 12 is held at each end of main body 10 by any suitable holding means 11, here a metal plate screwed against body 10, in order to keep socket 12 from sliding in body 10, and possibly in order to improve the fluid-tightness. Socket 12 might be simply cemented or soldered in body 10 instead.

Metering piston 17, driven by a regulating nut 16 which is in turn actuated by a control unit 31, is fitted within adjusting socket 12. The stroke of piston 17, indicated by arrow A, permits the admission and ejection of the product to be metered into and out of a metering chamber 4. Chamber 4 is bounded on one side by piston 17 and on the other side by stopping pin 13. Regulating nut 16, adjustable by screwing, allows the decrease or increase of a measured quantity 3 contained in chamber 4. An admission duct 14 and an ejection duct 15 pass through main body 10. Duct 14 is preferably situated upstream and connects metering chamber 4 to a feed source 22. Duct 15 is disposed downstream and connects chamber 4 to a distribution pipe 23. Actuating means 20, comprising a fixed portion and a movable portion capable of being displaced owing to conventional slide elements, permit movement of the assembly formed by regulating nut 16, stopping pin 13, and metering piston 17 relative to main body 10. This relative movement between stopping pin 13 and body 10, along a path B, makes it possible to place metering chamber 4 facing either admission duct 14 or ejection duct 15 for the purpose of either filling or emptying chamber 4.

Actuating means 20 include a movable support 25 actuated by lateral displacement means 26, e.g., a set of conventional jacks or any other electric, hydraulic, or manual means allowing lateral movement of support 25. Fixing blocks 27a and 27b are disposed at the ends of support 25. The first of these blocks, 27a, serves to hold the free end of stopping pin 13 owing to a positioning slot 24 (see FIG. 2) in which pin 13 is disposed. The driving head 19a of stopping pin 13 is thus axially gripped by the first fixing block 27a. The other block, 27b, serves as a fixing point for control unit 31. The movements of regulating nut 16 and movable support 25 when acted upon by control unit 31 and lateral displacement means 26, respectively, are carried out by means of an automatic control, preferably of a pneumatic type, allowing very advantageous operating speeds to be achieved. However, any other type of means, e.g., electric or hydraulic, may be used instead. A sliding support 28, mechanically connected to control unit 31 by a control rod 32, is disposed on support 25 so as to be able to move laterally on movable support 25 when acted upon by control unit 31. Sliding support 28 in turn serves as a non-permanent fixing point for the other driving head 19b of metering piston 17, which is fixed similarly to the first driving head, 19a, by means of a positioning slot 24 on sliding support 28.

The fixed part of means 20 comprises a fastening body 21 on which the bottom of main body 10 is disposed. These two elements are detachably joined by at least one assembling means 2, preferably a screw-type means. Fastening body 21 holds main body 10 fixed when movable support 25 is displaced. This yields the aforementioned relative movement between stopping pin 13 and main body 10. Further-more, the type of fastening used to hold driving heads 19a and 19b of stopping pin 13 and of piston 17 allows them to be withdrawn or inserted with the greatest of ease by a simple vertical movement of these elements.

Because of the modularity of the inventive metering device, metering module 1 can be interchanged very easily as a function of the desired metering capacity. Owing to the use of detachable assembling means 2, preferably of a screw type, and to the detachable fixing of driving heads 19a and 19b, it is possible to assemble and disassemble interchangeable metering module 1 very quickly. From a family of modules 1, each including an adjusting socket 12, a stopping pin 13, and a metering piston 17 of different diameters, a module may be selected having a capacity corresponding to the quantity to be metered. Regulating nut 16 allows very precise fine adjustment of the measured quantity by simple screwing. Interchangeable module 1 comprises a minimum of parts, and its cost price is advantageous compared to the rest of the device.

FIG. 2 illustrates a second embodiment of the invention wherein it is possible to dispose several interchangeable modules 1 in parallel, e.g., for producing mixtures in which the substances to be combined must be measured out very precisely. Control unit 31 connects driving heads 19a and 19b, which are thus actuated simultaneously by control rod 32. A single driving means 31 then suffices for actuating a plurality of pistons 17. Just as in prior art devices, rod 32 is actuated automatically, preferably by means of a pneumatic-type control. In a design similar to the metering device of FIG. 1, the device of FIG. 2 is likewise modular owing to the interchangeability of the modules 1. The advantages of such modularity are still greater for a multiple device: modules comprising elements of different sizes may be matched according to a virtually infinite number of possibilities in order to produce one or more mixtures, from the simplest to the most complex, inasmuch as adjustment of the piston stroke and the larger or smaller diameters of the different elements make for great flexibility.

As may be seen in FIGS. 3a–3d, the inventive metering device operates similarly to that described in the initially mentioned Swiss Patent No. 664,440. First of all, in FIG. 3a, actuating means 20 is drawn back. Metering chamber 4 is then positioned so as to be aligned with admission duct 14. Grease can then be admitted into chamber 4 when piston 17 is moved upstream. In FIG. 3b, actuating means 20 is pushed forward. Metering chamber 4 is then positioned so as to be aligned with ejection duct 15. The measured amount of grease can then be ejected from chamber 4 by displacement downstream of metering piston 17 through the stroke set by means of nut 16, as shown in FIG. 3c. To complete the operating cycle of the device, actuating means 20 is returned to its withdrawn position, as shown in FIG. 3d. Access to admission duct 14 is then freed again, and the pressurized grease may once more fill metering chamber 4.

Although the foregoing description relates more specifically to a metering device device for lubricants (oil or grease), the inventive device lends itself just as well to the metering of countless other viscous or pasty substances to be applied in the form of exactly measured amounts, often in small quantities.

The inventive modular metering device makes it possible to supply a very broad range of metered amounts with a single device. Its modularity allows the exchange of metering modules having different piston diameters corresponding to larger or smaller metered quantities. Through the re-use of most of the constituent parts of the device, a more advantageous cost price is obtained. Moreover, the multiple modular metering device allows different constituents of grease, glue, etc., to be metered very precisely. The inventive multiple metering device is of a very simple and economical design since the metering heads are driven simultaneously by a single mechanism.

What is claimed is:

1. A metering device comprising:

a main body including a continuous bore, an adjusting socket disposed in said bore, a movable stopping pin disposed partially in said socket, a movable metering piston disposed partially in said socket opposite said stopping pin, said main body, said stopping pin, and said metering piston forming an interchangeable module, a movable metering chamber of variable volume bounded by the inside wall of said socket, said stopping pin, and said piston, at least one admission duct and one ejection duct, each connected independently to said chamber for allowing admission thereto and expulsion therefrom of the substance to be metered, at least one control unit for controlling displacement of said piston, actuating means for displacing said pin and said stopping piston simultaneously relative to said main body, and assembling means detachably securing said interchangeable module to said actuating means.

2. The metering device of claim 1, wherein said assembling means are screw-type means.

3. The metering device of claim 1, wherein said actuating means comprise lateral displacement means for imparting a lateral movement to said stopping pin and said piston, a movable support actuated by said lateral displacement means, and a fastening body for keeping said main body fixed during said movement.

4. The metering device of claim 3, wherein said control unit is fixed to said movable support.

5. The metering device of claim 3, wherein said lateral displacement means are pneumatic means.

6. The metering device of claim 3, wherein said movable support includes at least two fixing blocks having respective positioning slots, said stopping pin and said piston each including a driving head detachably inserted in a respective one of said positioning slots, said stopping pin and said piston cooperating with said actuating means via said driving heads.

7. The metering device of claim 1, wherein said control unit is a pneumatic unit.

8. The metering device of claim 1, further comprising a regulating nut disposed between each said piston and said control unit for adjusting the stroke of each said piston independently.

9. The metering device of claim 1 comprising a single said interchangeable module.

10. The metering device of claim 1 comprising more than one said interchangeable module.

* * * * *